US007099338B1

(12) United States Patent
Lee (10) Patent No.: US 7,099,338 B1
(45) Date of Patent: Aug. 29, 2006

(54) SYSTEM AND METHOD FOR INSURING DYNAMIC HOST CONFIGURATION PROTOCOL OPERATION BY A HOST CONNECTED TO A DATA NETWORK (75) Inventor: Ronald B. Lee, Northbrook, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/259,757

(22) Filed: Feb. 27, 1999

(51) Int. Cl.
H04L 12/56 (2006.01)

(52) U.S. Cl. ............... 370/401; 709/220; 709/223

(58) Field of Classification Search ........ 370/351–360, 370/250–254, 238, 400–410; 709/250, 219, 709/220, 221–229, 202
See application file for complete search history.

(56) References Cited

U.S. PATENT DOCUMENTS

| | | | |
|---|---|---|---|
| 4,644,533 A | 2/1987 | Braff et al. ............... 370/94 |
| 4,881,263 A | 11/1989 | Herbison et al. ............ 380/21 |
| 4,996,685 A | 2/1991 | Farese et al. ............. 370/58.1 |
| 5,014,234 A | 5/1991 | Edwards, Jr. .............. 364/900 |
| 5,138,712 A | 8/1992 | Corbin ..................... 395/700 |
| 5,301,273 A | 4/1994 | Konishi ..................... 395/200 |
| 5,347,304 A | 9/1994 | Moura et al. |
| 5,430,727 A | 7/1995 | Callon ..................... 370/85.13 |
| 5,442,749 A | 8/1995 | Northcutt et al. ....... 395/200.09 |
| 5,488,412 A | 1/1996 | Majeti et al. |
| 5,489,897 A | 2/1996 | Inoue ..................... 340/870.39 |
| 5,528,595 A | 6/1996 | Walsh et al. ............. 370/85.13 |
| 5,583,931 A | 12/1996 | Schneider et al. |
| 5,586,121 A | 12/1996 | Moura et al. |
| 5,598,410 A | 1/1997 | Stone ..................... 370/469 |
| 5,600,717 A | 2/1997 | Schneider et al. |
| 5,606,606 A | 2/1997 | Schneider et al. |
| 5,608,446 A * | 3/1997 | Carr et al. ................... 348/6 |
| 5,610,910 A | 3/1997 | Focsaneanu et al. ........ 370/351 |
| 5,623,542 A | 4/1997 | Schneider et al. |
| 5,623,601 A | 4/1997 | Vu ..................... 395/187.01 |
| 5,636,211 A | 6/1997 | Newlin et al. |
| 5,675,732 A * | 10/1997 | Majeti et al. ............. 395/200.1 |
| 5,675,742 A | 10/1997 | Jain et al. ................... 395/200 |
| 5,678,041 A | 10/1997 | Baker et al. ................. 395/609 |
| 5,708,654 A | 1/1998 | Arndt et al. ................ 370/242 |
| 5,710,885 A | 1/1998 | Bondi ....................... 709/224 |
| 5,724,510 A | 3/1998 | Arndt et al. ............. 395/200.5 |
| 5,761,602 A | 6/1998 | Wagner et al. .............. 455/3.1 |
| 5,778,181 A | 7/1998 | Hidary et al. .......... 395/200.48 |
| 5,784,597 A | 7/1998 | Chiu et al. ................. 395/552 |
| 5,790,198 A | 8/1998 | Roop et al. ................ 348/460 |

(Continued)

OTHER PUBLICATIONS

"Radio Frequency Interface Specification (Interim Specification) SP-RFI-I04-980724", MCNS Holdings, L.P., 1997, pp. ii to 196.
"Radio Frequency Interface Specification (Interim Specification) SP-RFI-I05-991105", MCNS Holding, L.P., 1999, pp. ii to 202.
"Radio Frequency Interface Specification (Interim Specification) SP-RFIv1.1-I06-001215", MCNS Holding, L.P., 2000, pp. ii to 432.
Droms, R., *Dynamic Host Configuration Protocol*, Request for Comments 1541, Oct. 1993, pp. 1 to 39.

(Continued)

*Primary Examiner*—Chi Pham
*Assistant Examiner*—Phuc Tran
(74) *Attorney, Agent, or Firm*—McDonnell Boehnen Hulbert & Berghoff LLP (57) ABSTRACT A system and method for ensuring a connection to a configuration server by a customer premises equipment. The customer premises equipment is connected to a data network via a network connection. The data network includes a connection to the data network. A temporary configuration server is included to respond to configuration messages from the customer premises equipment before the network connection is capable of sending messages over the data network.

21 Claims, 8 Drawing Sheets

U.S. PATENT DOCUMENTS

| | | | |
|---|---|---|---|
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 348/7 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 714/756 |
| 5,828,655 A | 10/1998 | Moura et al. | 370/326 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A * | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A * | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A * | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser et al. | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A * | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 * | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar et al. | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 * | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,697,360 B1 * | 2/2004 | Gai et al. | 370/389 |
| 2002/0122050 A1 | 9/2002 | Sandberg | 345/705 |
| 2003/0028891 A1 | 2/2003 | Hardt et al. | 725/107 |

OTHER PUBLICATIONS

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vender Extensions*, RFC 2132, Mar. 1997, pp. 1-37.

"Radio Frequency Interface Specification (Interim Specification) SP-RFIv1.1-103-991105", MCNS Holdings, L.P., 1999, pp. Ii to 366.

* cited by examiner

SYSTEM AND METHOD FOR INSURING DYNAMIC HOST CONFIGURATION PROTOCOL OPERATION BY A HOST CONNECTED TO A DATA NETWORK

BACKGROUND OF THE INVENTION

A. Field of the Invention

The present invention relates to the field of network communications and, more particularly, with the configuration of network devices in a data network.

B. Description of Related Art

Cable television service providers are taking advantage of the extensive reach of the cable network infrastructure to offer high-speed data network access to users of computing equipment, such as personal computers. Channels on the cable television network may be allocated for use as data network access channels to exploit channel bandwidths of 6 MHz on a medium having a frequency range of up to 1 GHz.

Subscribers of cable service may access data network services by connecting computers to the cable network using cable modems. Subscribers may also access data networks via one or more cable modems connected on a local area network. A cable modem has a radio interface connection to a broadband coaxial cable infrastructure and a data interface connection to the computer, or to a computer network. When used to connect a computer to the cable network, the cable modem may operate internal to the computer in a card slot with a direct connection to the bus system in the computer. The cable modem may also operate external to the computer with an external connection (e.g. Ethernet, serial, etc.) to the cable modem data interface.

Data networks connected to a cable network form what are called Data Over Cable Systems. Data over cable systems use a device called a cable modem termination system as an intermediary between a number of cable modems connected over the coaxial communications medium and a data network. The data network may also include a connection to the Internet. The cable modem termination system operates along with other system components in a "head-end" of the cable network. A cable service provider uses the cable modem termination system to distribute services to the cable modems connected to it. The cable modem termination system also provides facilities that may be used to manage the resources available to the cable modems.

Cable modems may operate on a bi-directional cable system or on a uni-directional cable system. In a bi-directional cable system, the cable modems may communicate with the cable modem termination system over the coaxial medium in both directions. That is, the cable modems may transmit and receive data to and from the cable modem termination system over the coaxial medium.

In an uni-directional cable system, data is communicated over the coaxial medium in a "downstream" direction only. That is, the cable modem may only receive data from the head-end of the cable network over the coaxial medium. The cable modem may transmit data in the "upstream" direction to the head-end of the cable network using an alternative communications device; such as by a telephone connection over the public switched telephone network (PSTN). Because cable networks have been traditionally used as a broadcast medium for cable television, most data over cable systems are still unidirectional systems.

Uni-directional and bi-directional data over cable systems perform a procedure for configuring the cable modems to connect to a data network. The Dynamic Host Configuration Protocol (DHCP) is used by devices that are connected to networks, such as the Internet, to obtain configuration parameters and other information that make it possible for the devices to communicate on the Internet. The devices perform the DHCP protocol as clients that query a DHCP server during the initialization procedure performed by the device at boot up. Once the DHCP server responds with the appropriate parameters, the devices may begin to communicate by sending and receiving packets on the Internet. The DHCP may be used by client computers and by cable modems that are connected to a data over cable system.

The parameters that a device may obtain using the DHCP include an Internet Protocol address (IP address), a list of domain name servers, a domain name, the lease time of the IP address, a default gateway for the device, a trivial file transfer protocol (TFTP) server address and TFTP file name. The DHCP has been adopted by the industry as a standard protocol that is documented in RFC 2131. The RFC 2131 describes the many parameters that may be obtained from the DHCP server. The RFC 2131 also describes instructions for communicating with the DHCP server. In a data over cable system, client computers and cable modems each use configuration parameters from a DHCP server before communicating on a data network. The cable modems obtain parameters during the initialization and registration process. The client computers may also obtain configuration parameters during system initialization.

The client computer uses the cable modem to access the data network, and thus, to access the DHCP server. However, until the cable modem is properly initialized, registered and fully connected, it cannot perform communications functions for the client computer or computers to which it is connected. This may cause problems for client computers in a variety of scenarios. For example, a computer may attempt to use a bi-directional cable modem to issue DHCP messages before the RF cable has been connected to the cable modem. In addition, if the cable modem and the computer are on the same power strip or if an internal cable modem is used and powered by the computer's bus system, the two always power-up simultaneously. If it takes more time for the cable modem to power-up and to become initialized and registered than for the computers to perform DHCP messages, the DHCP messages will not be communicated. In such situations, the connection may become permanently shut down.

Moreover, any client computer that obtains configuration parameters from a DHCP server connected to a data network to which it accesses via a communications device, such as a modem, or a gateway, may experience the same difficulty. If the communications device takes more time to initialize than it takes the client computer to begin requesting configuration parameters, the client computer may not be able to access configuration parameters from the DHCP server. Because a failure to retrieve configuration parameters is typically treated as an error, the client computer may require a restart to begin another request for configuration parameters. Where the communications device is connected to the client computer system bus, the communications device is reset whenever the client computer is reset. The client computer may never obtain configuration parameters in such a scenario permanently shutting down its connection to the data network.

It would be desirable to ensure DHCP operation on a client computer without the risk of permanently losing the connection through the communications device if the communications device is also not yet ready or able to perform DHCP messages from the client to the server.

It would be desirable to ensure DHCP operation on a client computer without the risk of losing the connection through the cable modem permanently if the cable modem is not yet ready or able to perform DHCP messages from the client to the server.

SUMMARY OF THE INVENTION

In view of the above, according to one aspect of the present invention an improved communication system comprising a customer premises equipment connected to a data network via a network connection is provided. The customer premises equipment communicates with the data network when configured with a client network address. The customer premises equipment issues configuration messages to a configuration server connected to the data network to retrieve the client network address from the configuration server. The improvement includes a temporary configuration server for responding to configuration messages from the customer premises equipment before the network connection is capable of connecting the customer premises equipment to the data network.

In a further aspect of the present invention, a cable modem is provided for providing a customer premises equipment with access to a configuration protocol server connected to a data network over a broadband coaxial cable medium. The data network includes an interface to the broadband coaxial medium at a head-end of the broadband coaxial medium. The cable modem includes a cable input/output interface for communicably connecting the cable modem to the broadband coaxial cable medium. A data input/output interface is provided to communicably connect the cable modem to the customer premises equipment. A temporary configuration protocol server is included to respond to configuration messages from the customer premises equipment before the cable modem is capable of connecting the customer premises equipment to the data network.

In a further aspect of the present invention, a method is provided for ensuring a connection to a configuration server on a data network by a customer premises equipment. The customer premises equipment is connected to a network connection for interfacing to the data network. According to the method a request is issued for a customer premises equipment network address from the customer premises equipment to the configuration protocol server via the network connection. The network connection determines whether a connection can be made to the configuration protocol server. If not, the network connection responds to the customer premises equipment by sending a temporary network address to the customer premises equipment.

BRIEF DESCRIPTION OF THE DRAWINGS

Presently preferred embodiments of the invention are described below in conjunction with the appended drawing FIGs., wherein like reference numerals refer to like elements in the various FIGs., and wherein.

DETAILED DESCRIPTION OF THE PREFERRED EMBODIMENT

The description that follows fully incorporates by reference the following co-pending patent applications: "METHOD AND SYSTEM FOR SECURE CABLE MODEM INITIALIZATION", U.S. patent Ser. No. 09/018,756 to Nurettin B. Beser (filed Feb. 4, 1998 and assigned to the assignee of the present invention); "METHOD AND SYSTEM FOR SECURE CABLE MODEM REGISTRATION", U.S. patent Ser. No. 09/018,372 to Nurettin B. Beser (filed May 14, 1998 and assigned to the assignee of the present invention); and "METHOD AND SYSTEM FOR CABLE MODEM INITIALIZATION USING DYNAMIC SERVERS", U.S. patent Ser. No. 09/018,400 to Nurettin B. Beser (filed May 14, 1998).

Figure 1:
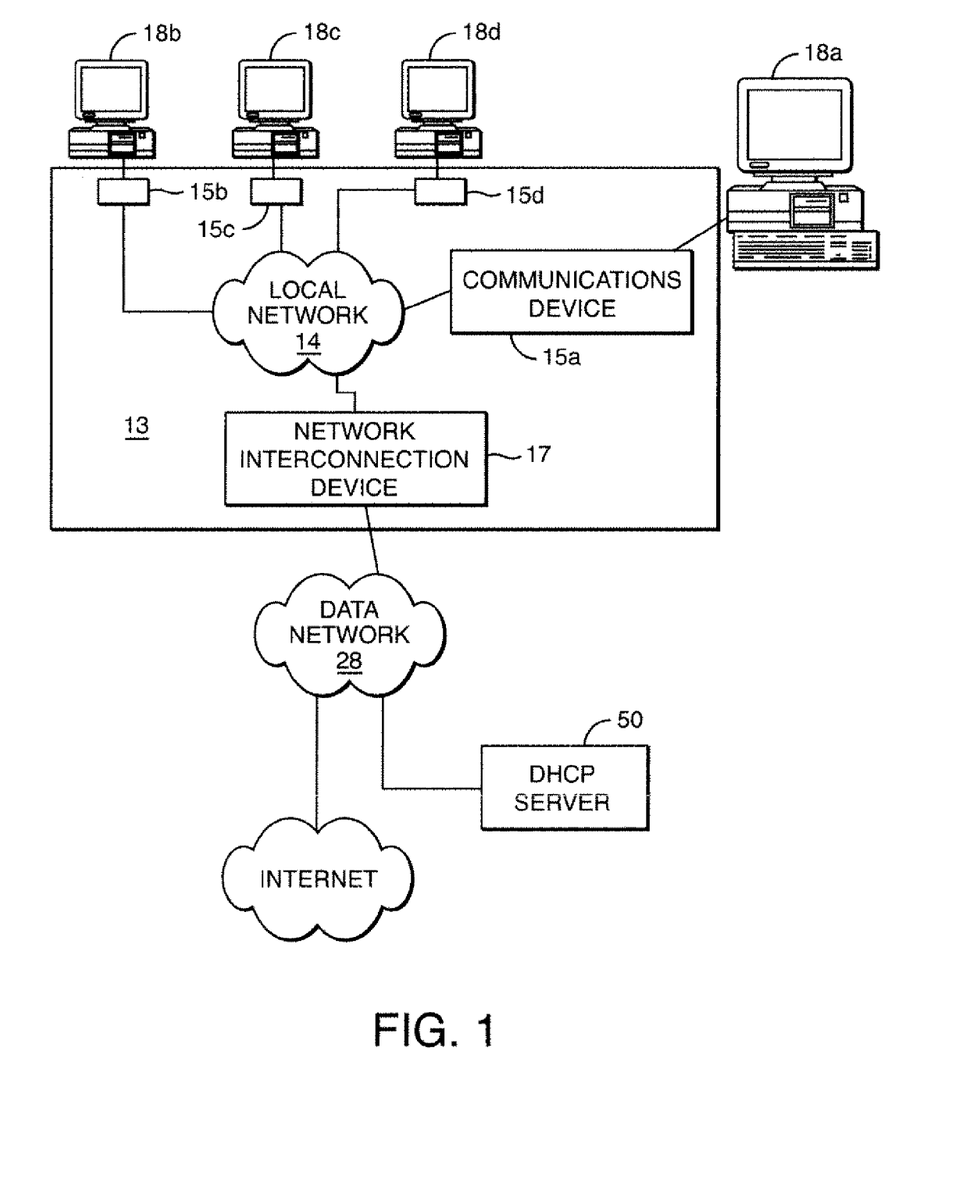
FIG. 1 is a block diagram of a network of the type in which the present invention finds particular use.

FIG. 1 is a block diagram showing a system that may be used by a customer premises equipment 18a to retrieve configuration parameters from a configuration server 50 for communicating over a data network 28. The customer premises equipment 18a communicates with the data network 28 over a network connection 13 as a host to the configuration server 50. The network connection 13 may include a local network 14 over which the customer premises equipment communicates with other customer premises equipment 18b–d. The network connection 13 may also include communications devices 15a–d that connect corresponding customer premises equipment 18a–d to the local network 14. A network interconnection device 17 connects the local network 14 to the data network 28.

The communications devices 15a–d may include any device for communicably connecting the corresponding customer premises equipment 18a–d to the local network 14. A suitable communications device is selected according to the type of network used for the local network 14. For example, the communications devices 15a–d may include cable modems when the local network 14 is a cable network. For another example, the communications devices 15a–d may include serial modems for when the local network 14 is a general switched telephone network. For yet another example, the communications devices 15a–d may include network interface adapters when the local network 14 is a network communicating with ethernet, token ring, etc. The communications devices 15a–d may also include a combination of devices, such as a telephony return cable modem with a serial connection to the general switched telephone network and a coaxial connection for connection to the cable network. The communications devices 15a–d may or may not require configuration parameters to enable communication between the customer premises equipment 18a–d and the data network 28.

The network interconnection device 17 may include any server, gateway, bridge, router or other type network device for connecting one network to another network. The network interconnection device 17 connects the local network 14 to the data network 28. Appropriate protocol stacks are included in the network interconnection device 17 to ensure that the local network 14 can communicate with the data network 28. One protocol included in such protocol stacks may include a configuration protocol to permit the network interconnection device 17 to retrieve configuration parameters from the configuration server 50.

The network interconnection device 17, the local network 14 and the communications devices 15a–d provide the customer premises equipment 18a–d with the network connection 13 to the data network 28. Selected network communications protocols are performed by the components of the network connection 13 and the customer premises equipment 18a–d to provide extensive connectivity and functional capability. Specific embodiments of the network connection 13 exist and depend on the types of networks implemented for the local network 14 and the communications devices 15a–d. In one embodiment, the local network 14 is a cable network and the communications devices 15a–d are cable modems that provide the customer premises equipment 18a–d with access to the data network 28 through the cable network. The cable network may be bi-directional or uni-directional. In the uni-directional network, the local network 14 may include a general switched telephone network and the cable network.

In an alternative embodiment, the local network 14 may comprise an ethernet network, or other network type such as a token ring, a Universal Serial Bus, etc. The communications devices 15a–d include appropriate network adapters for communicating over the local network 14. The network adapters may be installed in a chassis for a bus system in the customer premises equipment 18a–d. The network interconnection device 17 includes a data over cable system in which a cable modem is communicably connected to the local network 14. The cable modem provides all of the customer premises equipment 18a–d with shared access to the data network 28. The cable modem in the network interconnection device 17 is connected to a cable network. The cable network is connected to a cable modem termination system, which provides the cable modem with access to the data network 28. The cable modem in such an embodiment may require configuration parameters from the configuration server 50.

The customer premises equipment 18a–d may include any type of computer, or device that uses computing resources, that may communicate with the data network 28. The customer premises equipment 18a–d are clients of the configuration server 50 from which it retrieves configuration parameters during initialization. The customer premises equipment 18a–d use the configuration parameters to communicate over the data network 28. Such parameters may include network addresses without which the communication over the data network 28 beyond broadcast searches for a server may not be possible.

The data network 28 in a preferred embodiment is connected to the Internet. The configuration server 50 in a preferred embodiment is the dynamic host configuration protocol (DHCP) server. One of ordinary skill in the art will appreciate that any data network 28 and any configuration server 50 operable to perform a configuration protocol that is compatible with the data network 28 may be used.

Embodiments of the present invention advantageously permit the customer premises equipment 18a–d to initialize in cases in which an operable network connection to the configuration server 50 may be unavailable. In a preferred embodiment, a temporary configuration server operates in the communications device 15a or in the network interconnection device 17 to provide temporary configuration parameters to the customer premises equipment 18. The configuration parameters are provided with a mechanism for requiring further requests for configuration parameters at a later time. For example, in a preferred embodiment, the temporary configuration parameters are provided with a lease time. Upon expiration of the lease time, the customer premises equipment 18 is required to make another request for configuration parameters. At this time, the temporary configuration server determines if an operable connection to the configuration server 50 is possible. If it is not, the configuration server provides the same configuration parameters and lease time. If the connection is available, the temporary configuration server permits the request to be communicated to the configuration server 50.

Figure 2:
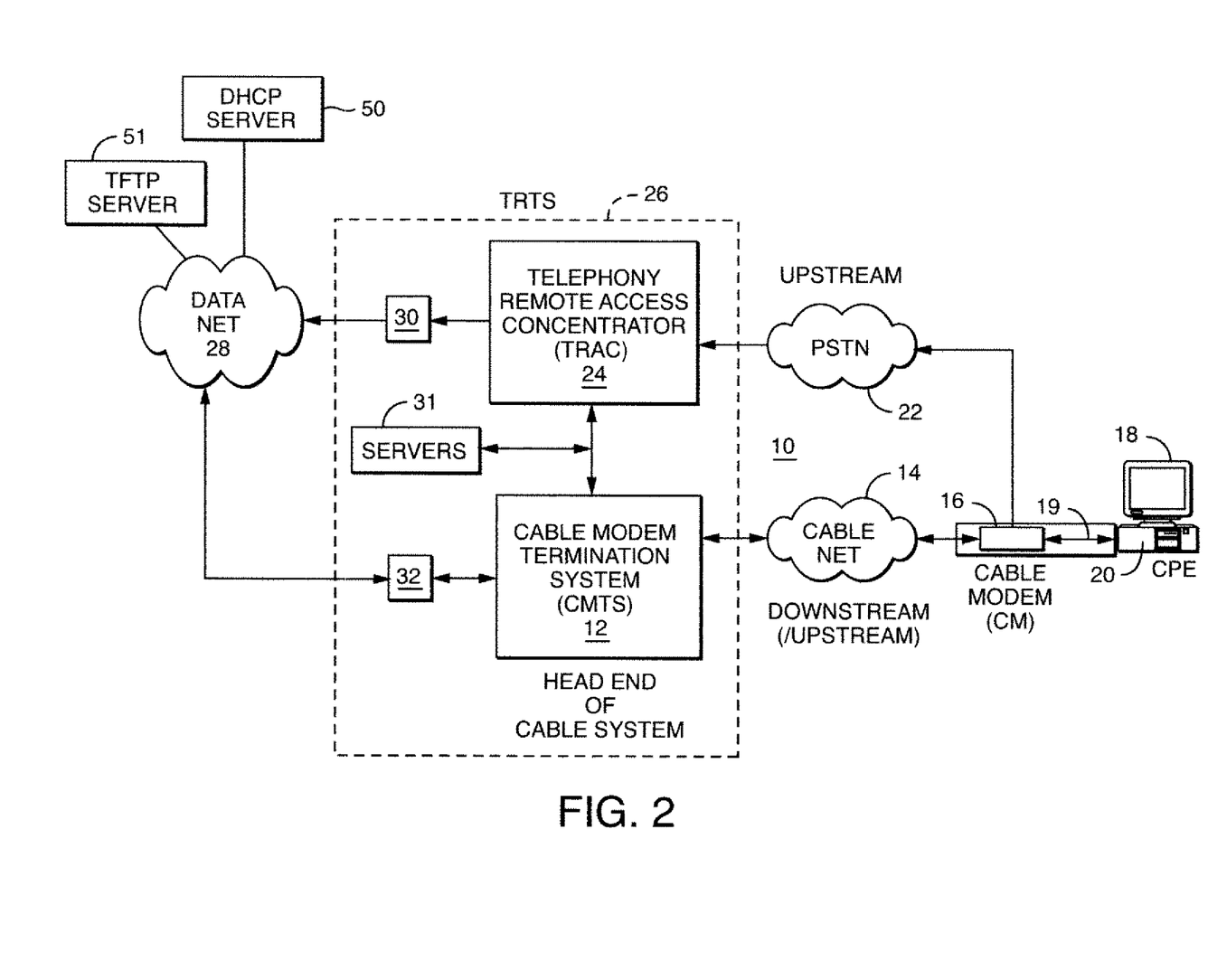
FIG. 2 is a block diagram of the network in FIG. 1 in a data over cable network system.

A data over cable network system is one example of a network in which embodiments of the present invention may find advantageous use. FIG. 2 is a block diagram showing a data over cable network 10. It is to be understood by one of skill in the art that the data over cable network 10 is described as an example. The data over cable system used in the present invention may be configured in other ways not shown here.

Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in unidirectional cable systems. An upstream data path is the flow of data from customer premise equipment back to the cable television network headend.

However, data-over-cable system 10 may also provide a bi-directional data path (i.e., both downstream and upstream) without telephony return as is also illustrated in FIG. 2. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

The data over cable network 10 provides network access for a customer premises equipment (CPE) 18 via a cable modem network 14. The cable modem network 14 is connected to a data network 28 (e.g., an Internet subnet, an intranet, or any network that uses the transport control protocol/Internet protocol (TCP/IP)) by a cable modem termination system 12. The CPEs 18 may include DHCP clients for retrieving configuration parameters from a DHCP server 50. The CPE 18 may also retrieve configuration files from a trivial file transfer protocol server 51.

The CPE 18 in the network 10 of FIG. 2 may be a personal computer or workstation that uses the Windows NT, Windows 95 or later versions of Windows as an operating system. It is to be understood that any CPE using any operating system may be used in the CPE 18. The CPE 18 may include architecture for interfacing to communication devices. Such architecture advantageously standardizes communications interfaces and reduces the development time of application that uses communications interfaces.

The CPE 18 includes a cable modem to CPE connection 19, a cable modem-CPE interface (CMCI) 20, and a cable modem (CM) 16. The cable modem to CPE connection 19 may include a connection to the CPE bus if the cable modem 16 is implemented on a card, or circuit board, that plugs into the CPE bus structure. Alternatively, the cable modem 16 may be physically external to the CPE and connected by the cable modem to CPE connection 19 using an Ethernet network, token ring network, a serial connection, or any other suitable hardware connection.

The cable modem-CPE interface 20 includes the Windows Network Architecture and any drivers for controlling the hardware interface of the cable modem 16. The cable modem-CPE interface 20 includes any hardware drivers, protocol drivers and other hardware and software used to communicate with the cable modem 16.

In a uni-directional system, the cable modem 16 is connected to the cable modem network 14 which may include cable television networks such as those provided by Comcast Cable Communications Inc. of Philadelphia, Pa., Cox Communications, of Atlanta, Ga., Tele-Communications, Inc. of Englewood, Colo., Time-Warner Cable, of Marietta, Ga., Continental Cable Vision, Inc. of Boston, Mass. and others.

The cable modem 16 is connected to a Public Switched Telephone Network ("PSTN") 22 with an upstream telephony connection. The PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In a data-over cable system without telephony return, the cable modem 16 has an upstream connection to CMTS 12 via the cable network 14, a wireless connection, a satellite connection, or a connection via other technologies to send data upstream outside of the telephony return path. An upstream cable television connection via cable network 14 is illustrated in FIG. 2.

The cable modem 16 includes cable modems provided by the 3Com Corporation of Santa Clara, Calif. and others. The cable modem 16 may also include functionality to connect only to the cable network 14 and receives downstream signals from cable network 14 and sends upstream signals to cable network 14 without telephony return. The present invention is not limited to cable modems used with telephony return.

The cable modem 16 in FIG. 2 includes a computing platform that controls the communications functions performed by the cable modem 16. For example, the cable modem 16 may implement a variety of communications protocols. To implement one such protocol, the DHCP, the cable modem 16 includes a DHCP client for sending requests for configuration parameters to the DHCP server 50. Once the cable modem 16 receives configuration parameters, the CPE 18 can use the cable modem 16 to communicate with the data network 28.

In preferred embodiments of the present invention, the cable modem 16 also includes a temporary DHCP server for responding to DHCP requests from the CPE 18 while the cable modem 16 is in the process of connecting to the data network. Until the cable modem 16 is initialized including being assigned an IP address, it cannot communicate over the data network. Until the cable modem 16 is able to communicate over the data network 38, the CPE 18 is unable to request DHCP configuration parameters. In a preferred embodiment, the temporary DHCP server determines if the cable modem 16 is able to communicate over the data network 28. If the CPE 18 requests configuration parameters using DHCP and the cable modem 16 is unable to communicate over the data network 28, the temporary DHCP server replies with a temporary IP address. The temporary DHCP server may also provide a selected lease time to the CPE 18. The lease time insures that the CPE 18 will continue to request the IP address. The temporary DHCP server senses when the cable modem 16 is able to communicate over the data network 28 and responds to future requests for the IP address with a DHCP NACK message. The CPE 18 then makes a DHCP DISCOVER, which the cable modem 16 communicates to a DHCP server in the data network 28 instead of to the temporary DHCP server.

The cable modem 16 provides the CPE 18 with connectivity to the data network 28 via the CMTS 12 and the TRAC 24. The CMTS 12 and TRAC 24 may be at a "headend" of the cable system 10, or TRAC 24 may be located elsewhere and have routing associations to CMTS 12. The CMTS 12 and TRAC 24 together are called a "Telephony Return Termination System" ("TRTS") 26. The TRTS 26 is illustrated by a dashed box in FIG. 2. The CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers, shown as servers 31, may be used in data-over-cable system 10. The servers 31 may be in various locations.

Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

The TRAC 24 is connected to the data network 28 by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 2, and more or fewer components, connections and interfaces could also be used. In addition, the present invention may include any type of network that uses the DHCP server for configuration parameters and that runs using any operating system.

The DHCP server 50 and the TFTP server 51 may operate on any computer that is accessible to the cable modem 16 over the data network 28. Alternatively, the DHCP server 50 may be accessible over a local area network. The DHCP server 50 and the TFTP server 51 will provide configuration services for any DHCP client that may connect to it over the data network 28. For example, in the cable system 10 shown in FIG. 2, the DHCP server 50 may provide configuration services for the cable modem 16, any other cable modem connected to the cable network 14 and/or any network device connected to the data network 28.

Figure 3:
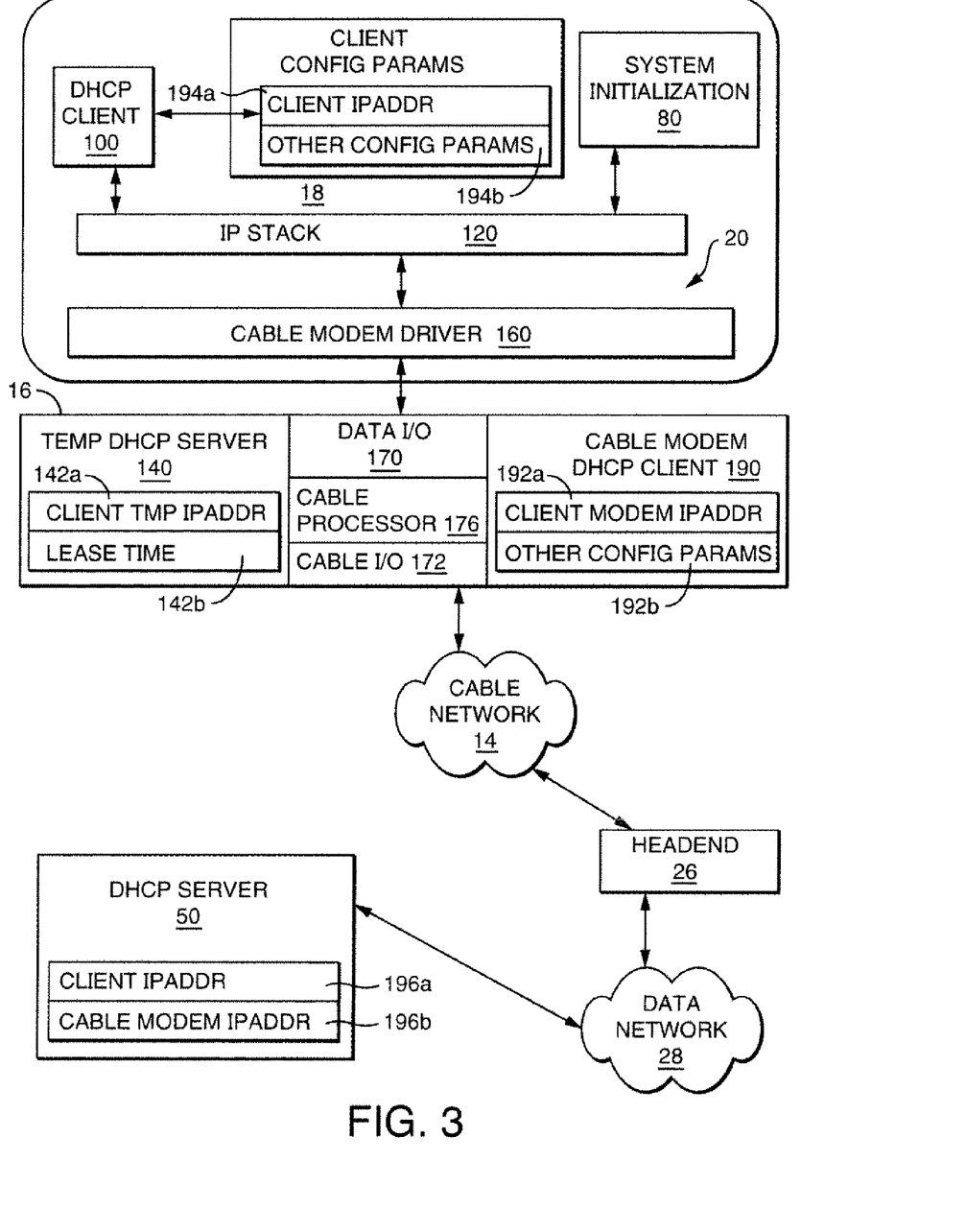
FIG. 3 is a customer premises equipment that uses the DHCP to obtain configuration parameters in the network shown in FIG. 1.

FIG. 3 is a block diagram of the CPE 18 showing the CPE to cable modem interface 20 according to a preferred embodiment of present invention. The CPE 18 in FIG. 3 uses the cable modem 16 to connect to the data network 28. The CPE 18 is preferably a computing platform functioning as a workstation, personal computer, server or other computing system that may connect to the data network 28. The CPE 18 includes a system initialization procedure 80, a DHCP client 100, and an Internet protocol (IP) stack 120. The CPE 18 and the cable modem 16 retrieve configuration parameters from the DHCP server 50.

The system initialization procedure 80 is performed on power-up or on any other re-initialization of the CPE system. One function of the system initialization procedure 80 is to initialize the hardware drivers used by the CPE to perform communications functions. With regards to communication over the data network 28, the CPE 18 initializes a driver for the cable modem 16 (described below) and attempts to broadcast requests for configuration parameters. The CPE 18 requests configuration parameters from the DHCP server 50 over the data network 28 using one or more DHCP DISCOVER messages. When replies to the DHCP DISCOVER messages are received, the CPE 18 stores the configuration parameters in a memory space for client configuration parameters 194*a*, *b*.

The DHCP client 100 performs DHCP operations for the CPE 18. The DHCP DISCOVER message and messages sent in response to DHCP parameter negotiation (e.g. DHCP REQUEST, DHCP OFFER, etc.). The DHCP client 100 may also sense when the lease time for an IP address has expired, or may respond with a request to renew the IP address by issuing a DHCP RENEW message. The operation of the DHCP client 100 is preferably in conformance with the provisions of RFC 2131.

The DHCP server 50, as shown in FIG. 3, provides a client IP address 196*a* to the CPE 18, and a cable modem IP address 196*b* to the cable modem 16. Although one DHCP server 50 is shown in FIG. 3, one of ordinary skill in the art will appreciate that DHCP messages may be handled by different DHCP servers, or by selected DHCP servers. The operation of the DHCP server 50 is preferably in conformance with the provisions of RFC 2131.

The IP stack 120 includes protocol drivers conforming to selected protocols for communicating with the data network 28 and to any other network to which a data connection is desired (i.e. the Internet). The protocols performed by the IP stack 120 may include the Universal Datagram Protocol (UDP), the Internet Protocol (IP), the transport control protocol (TCP), the point-to-point protocol (PPP), and any other protocol required for selected data network connections. The protocols selected for the IP stack 120 include a protocol having driver calls software that communicates to the cable modem 16 in the CPE to cable modem interface 20.

The CPE to cable modem interface 20 includes a cable modem driver 160 and the hardware and software components used to connect the cable modem 16 to the CPE 18. Such components may include the bus or other type of interconnect system and the drivers that control communications on the bus system. For example, the cable modem 16 may be implemented on a PCMCIA (Personal Computer Memory Card International Association) card that interfaces with the CPE 18 using the PCMCIA bus system. The cable modem 16 may also be implemented as an external device connected to the CPE 18 by an Ethernet-based local area network. The cable modem 16 may also be implemented on a card in a second CPE or server that is connected to the CPE 18 and used by the CPE 18 for access to the data network 28. In a preferred embodiment, the connections between the IP stack 120, the cable modem driver 160 and the cable modem 16 substantially conform to the Open System Interconnection ("OSI") model used to describe computer networks. Reference is made to the Multimedia Cable Network Systems ("MCNS") Data-Over-Cable Service Interface Specifications, Radio Frequency Interface Specification, SP-RFI-102-971008, (hereinafter "MCNS standard), which is incorporated herein by reference, for implementing the IP stack 120, the cable modem driver 160 and the cable modem 16 according to a preferred embodiment. The cable modem driver 160 executes communications commands for using the cable modem 16 to communicate over the cable network 14 to other devices on the data network, such as the DHCP server 50. In a Microsoft Windows operating system environment, the cable modem driver 160 may be developed using the Network Driver Interface Specification (NDIS) in the Windows Network Architecture. The Windows Network Architecture also includes libraries of function calls to protocol drivers, which are programs for executing the protocol performed by the IP stack 120. The protocol drivers may be accessed using the Transport Driver Interface (TDI) which is also known as a Windows socket. Information regarding the Windows Network Architecture or any other Windows programming resource may be found in the Microsoft Windows 95 Resource Kit published by the Microsoft Press by the Microsoft Corporation.

Drivers, such as the cable modem driver 160 in a preferred embodiment, that are developed using standard development tools, such as the NDIS in Windows, typically require a uniform set of parameters defined by a standard interface. The parameters include an IP address and other parameters that may be retrieved from the DHCP server 50.

The cable modem 16 in FIG. 3 includes hardware and software components for interfacing a data communications system (such as the CPE 18) to the coaxial communications medium. In a preferred embodiment, the components include a DHCP server 140, a data I/O interface 170, a cable modem processing system 176, a cable I/O interface 172, and a DHCP client 190. In the description that follows, the cable modem 16 in FIG. 3 is assumed to be a bi-directional cable modem. One of ordinary skill in the art will appreciate that preferred embodiments of the present invention may be carried out in a uni-directional system with the appropriate modifications, which are un-important to the present invention.

The data I/O interface 170 includes the hardware and software components for communicating with the CPE 18, which may include functions performed according to the protocols described above. The cable modem 16 may receive communications from the CPE 18 at the data I/O interface 170. The cable modem 16 may also send communications to the CPE 18 via the data I/O interface 170. In an internal cable modem 16, the data I/O interface 170 may include a PCI bus adapter and associated hardware drivers. In an external cable modem 16, the data I/O interface 170 may include an Ethernet, USB, or token ring adapter and associated drivers. It is to be understood by one of ordinary skill in the art that other components may be used in the data I/O interface 170.

The cable I/O interface 172 includes an RF interface and other hardware and software components for modulating and demodulating the RF signal and for communicating data to and from the RF interface 161. For examples of the cable I/O interface 172 according to a preferred embodiment, reference is made to the MCNS standard. Alternative embodiments may implement an RF interface as described in the IEEE ("Institute for Electrical and Electronic Engineers") standard 802.14 for cable modems.

The cable modem processing system 176 provides processing resources for the cable modem 16. Such resources include a central processor, memory and input/output control. The cable modem processing system 176 also includes an operating system that performs an initialization process. During the initialization process, the cable modem 16 performs initialization and registration functions by communicating initialization and registration messages to and from the headend 26 of the cable network 14. Included in these functions is the retrieval of configuration parameters from the DHCP server 50.

The cable modem DHCP client 190 performs the DHCP client functions for retrieving configuration parameters such as the IP address. The cable modem DHCP client 190 issues DHCP DISCOVER messages to obtain a cable modem IP address 192a and other configuration parameters 192b.

In a preferred embodiment of the present invention, the cable modem 16 includes a temporary DHCP server 140. The temporary DHCP server 140 is able to detect whether the cable modem 16 has established a connection for communication with the headend 26. If the cable modem 16 has yet to achieve a connection, the temporary DHCP server 140 responds to DHCP DISCOVER messages from the CPE 18 with a DHCP OFFER. The DHCP OFFER sent by the temporary DHCP server 140 includes a client temporary IP address 142a and a lease time 142b. Until the temporary DHCP server 140 senses that the cable modem 16 is fully connected, initialized and registered, it acknowledges requests to renew the temporary IP address 142a.

The temporary IP address 142a is preferably an IP address that has been reserved for this use, however, it may be any IP address that may be recognized by the cable modem 16 as being a temporary one. The temporary IP address 142a is maintained private to the CPE 18 or to other CPE's that may be connected to the cable modem 16. The temporary IP address 142a is not used for connectivity to any network. The cable modem 16 filters out any attempt to communicate using the temporary IP address 142a.

The CPE 18 is shown in FIG. 3 connected to the cable modem 16 which connects the CPE 18 to the data network 28. In an alternative embodiment, the cable modem 16 may provide communicative connectivity for other CPE's (see FIG. 1). In such an embodiment, the temporary DHCP server 140 includes a pool of temporary IP addresses 142a.

In addition, the lease time 142b may be set to a short enough length of time to make the use of the temporary IP address 142a unlikely. The lease time 142b is preferably from 5 to 10 seconds, however, shorter or longer lease times are possible. In one preferred embodiment, the lease time is less than 10 seconds. Because the cable modem 16 may require one or more minutes to achieve connectivity, the lease time 142b may expire, and the temporary IP address 142a may be renewed many times before the cable modem 16 has connectivity.

In a uni-directional system, the cable modem 16 communicates upstream on a telephony link. The dialing of the telephone to initiate the link may not occur at boot up and may even require other events to trigger it. As a result, the time it takes for the cable modem 16 to achieve connectivity may vary greatly, and may be indeterminate.

Once the cable modem 16 has achieved connectivity with the headend 26, the temporary DHCP server 140 responds to any further requests to renew the temporary IP address 142a with a message that does not acknowledge the request. The message that does not acknowledge the request to renew prompts the DHCP client 100 in the CPE 18 to issue a DHCP DISCOVER message to retrieve a new IP address. Because the cable modem 16 has established connectivity, the DHCP DISCOVER message is broadcast through the headend 26. The DHCP server 50 responds with a DHCP OFFER. The DHCP server 50 may be the first DHCP server to send a DHCP OFFER, or it may be the one that offers an acceptable set of configuration parameters.

The temporary DHCP server 140 in the cable modem 16 advantageously permits the CPE 18 to "wait" for a legitimate IP address and other configuration parameters when the cable modem 16 is unable to communicate with the headend 26.

FIGS. 4A–4E are block diagrams showing the message flow of DHCP messages issued by the CPE 18 and the cable modem 16 in the system shown in FIG. 2. FIGS. 4A–4E are described below as events that occur during a simultaneous re-boot of the CPE 18 and of the cable modem 16. One of ordinary skill in the art will appreciate, however, that the process illustrated by FIGS. 4A–4E advantageously insures DHCP connectivity by the CPE 18 in any situation in which it is sought before the cable modem 16 has achieved connectivity with the data network 28.

Figure 4A:
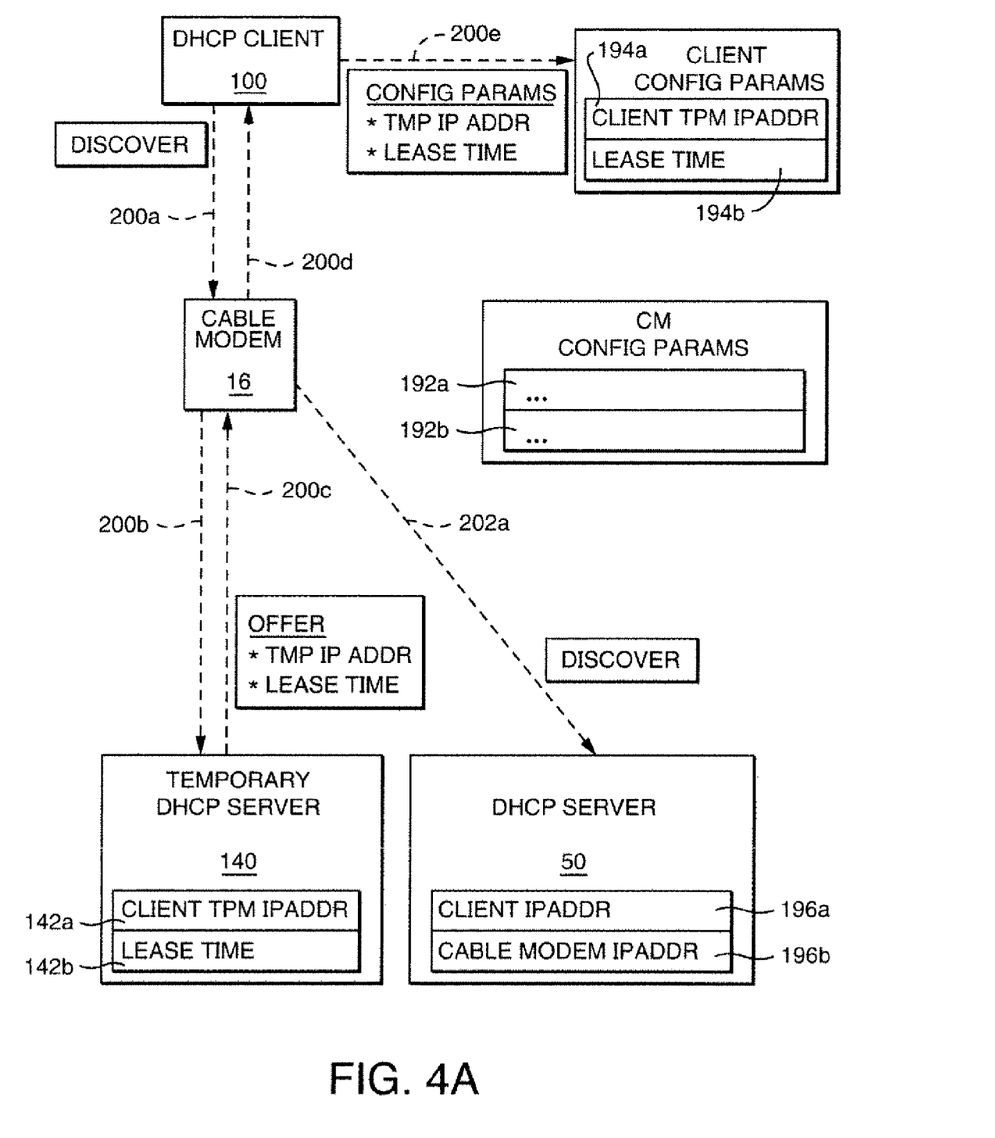
FIGS. 4A–E are block diagrams showing the status of the customer premises equipment and the flow of DHCP messages used during the negotiation of configuration parameters with the DHCP.

Referring to FIG. 4A, during the initialization of the cable modem driver 160 (shown in FIG. 3), the DHCP client 100 in the CPE 18 issues a DHCP DISCOVER message 200a. The DHCP DISCOVER message 200a is communicated to the cable modem 16 for transmission to the data network 28. The DHCP DISCOVER message 200a is issued for the purpose of discovering the DHCP server 50 connected to the data network 28 that will provide the CPE 18 with an IP address. The cable modem 16 is also initializing and as part of its initialization, it issues a cable modem DHCP DISCOVER message 202a to retrieve a cable modem IP address. As shown in FIG. 4A, the cable modem configuration parameters does not yet have the cable modem IP address 192a and the other configuration parameters 192b.

The cable modem driver 16 receives the CPE DHCP DISCOVER message 200a. Because the cable modem 16 has not achieved connectivity with the data network 28, the temporary DHCP server 140 receives the CPE DHCP DISCOVER message at 200b. The temporary DHCP server 140 includes the client temporary IP address 142a and the lease time 142b. The temporary DHCP server 140 responds by configuring a DHCP OFFER message 200c for transmission by the cable modem driver 16 to the DHCP client 100 over 200d. The DHCP OFFER message includes the temporary IP address and the lease time.

The DHCP client 100 receives the DHCP OFFER at 200d and issues a DHCP REQUEST to accept the configuration parameters. The DHCP server 50 responds with a DHCP ACKNOWLEDGE. When the DHCP client 100 receives the DHCP ACKNOWLEDGE, the DHCP client 100 sets the configuration parameters for the CPE 18 at 200e. The CPE IP address 194a is set to the temporary IP address and the other configuration parameters 194b includes the lease time. The temporary IP address 142a received by the CPE 18 may not be used for communication over the data network 28 since it was not assigned by the DHCP server 50. The cable modem 16 preferably filters any attempts by the CPE 18 to use the temporary IP address 142a.

Figure 4B:
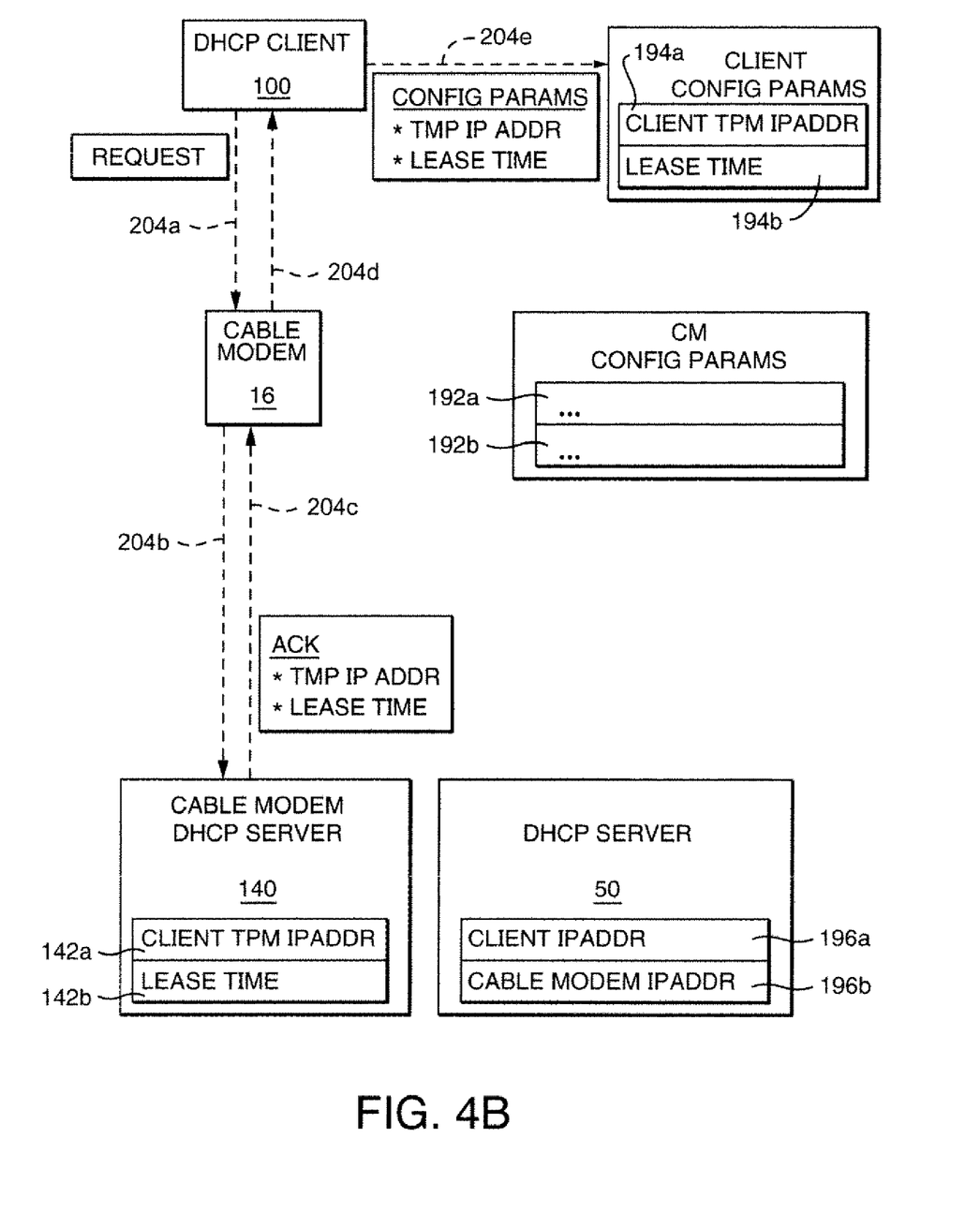

Referring to FIG. 4B, the time that the lease time provides for the assignment of the temporary IP address 142a to the CPE 18 may expire many times before the cable modem 16 is able to connect to the data network 28. Each time the lease time expires, the DHCP client 100 sends a request to renew the temporary IP address 142a at 204a in FIG. 4B. The cable modem 16 sends the request to the temporary DHCP server 140, which determines whether the cable modem 16 has achieved connectivity with the data network 28. If the cable modem 16 has not achieved connectivity with the data network 28, the temporary DHCP server 140 sends a DHCP ACK message at 204c. The DHCP client 100 receives the DHCP ACK message at 204d and re-assigns the temporary IP address at 204e with the lease time. The request to renew process shown in FIG. 4B may be repeated many times before a permanent IP address can be assigned to the CPE 18.

Figure 4C:
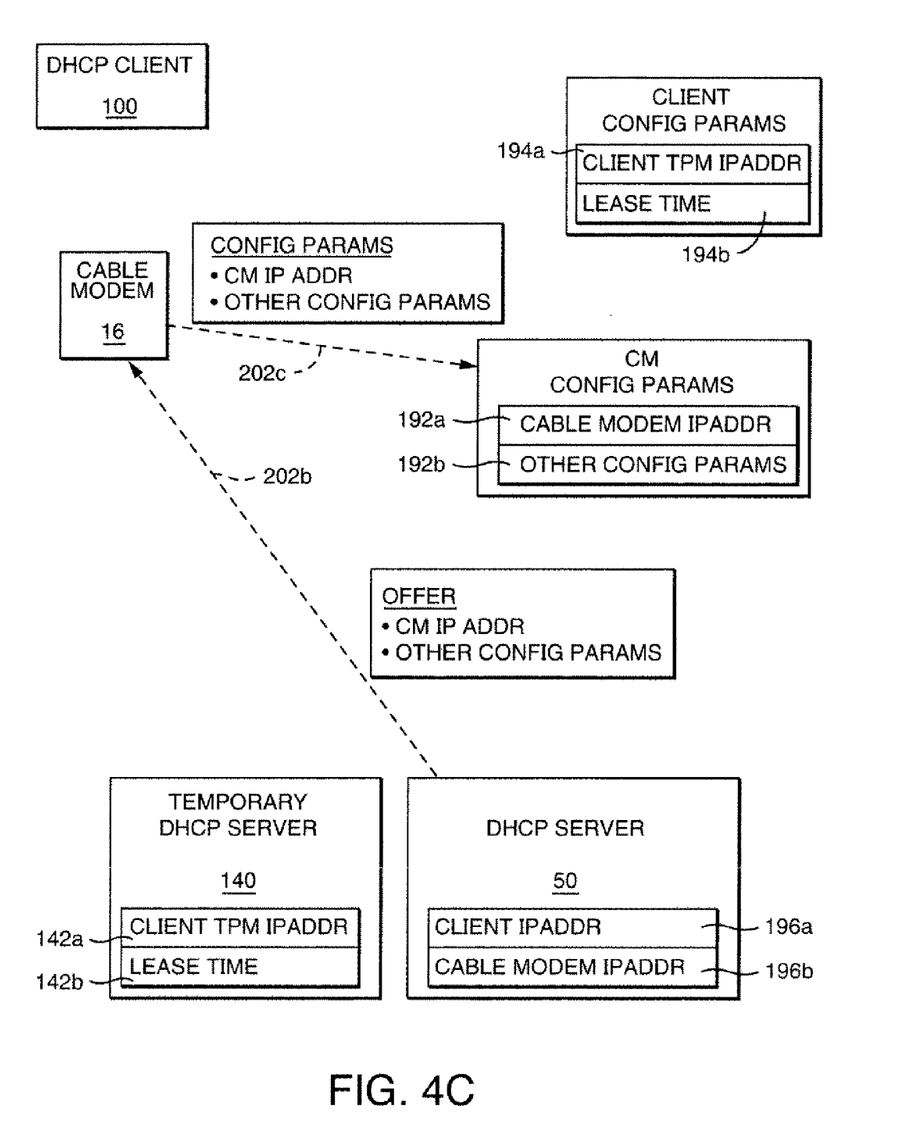

Referring to FIG. 4C, in response to the DHCP DISCOVER message 202a in FIG. 4A, the cable modem 16 receives a DHCP OFFER from the DHCP server 50 at 202b.

The DHCP OFFER message includes a cable modem IP address and other configuration parameters used by the cable modem 16 to communicate over the data network 28. The cable modem 16 sets the cable modem IP address 192a and the other configuration parameters 192b in a configuration parameter table. Once the cable modem 16 has received the cable modem IP address 192a and its other configuration parameters 192b, it may complete its initialization and registration process to achieve connectivity to the data network 28.

Figure 4D:
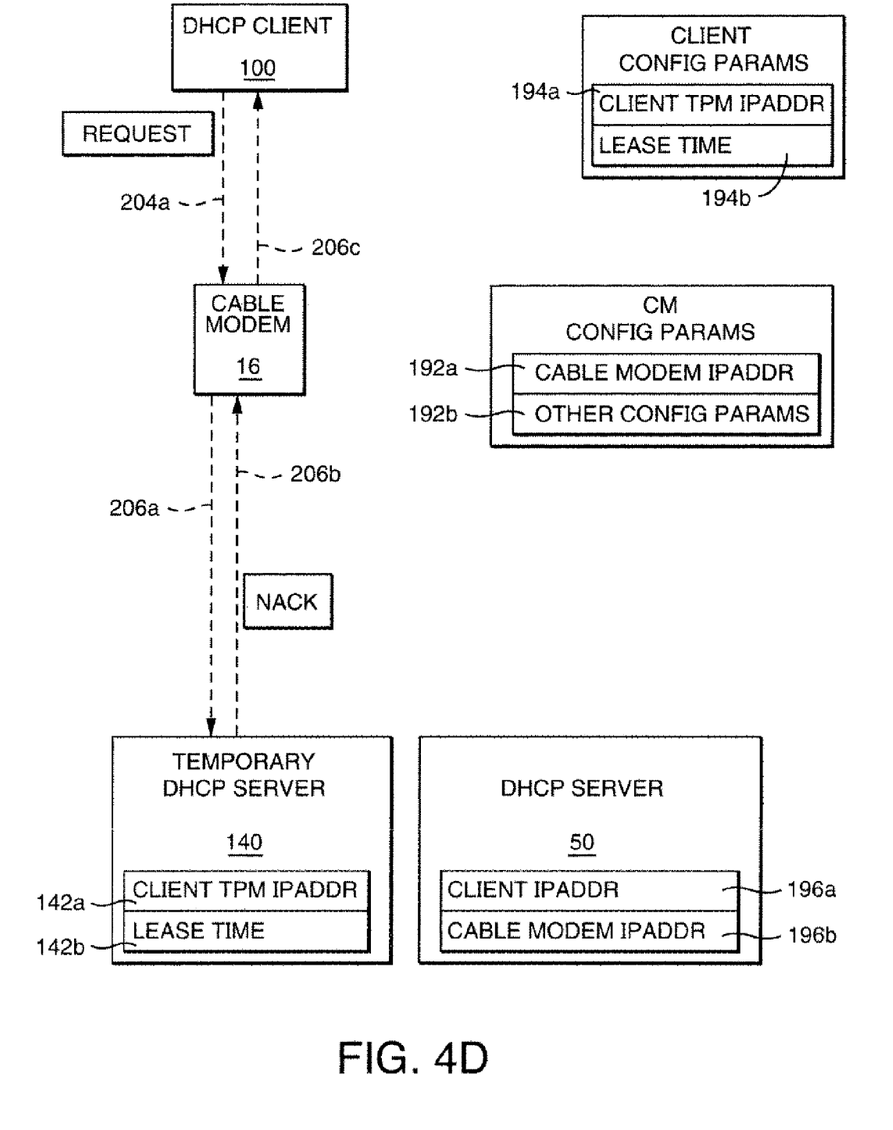

Referring to FIG. 4D, although the cable modem 16 has achieved connectivity with the data network 28, the DHCP client 100 in the CPE 18 continues to attempt to renew its temporary IP address 194a at 204a. The temporary DHCP server 140 receives the request at 206a. Because the cable modem 16 has achieved connectivity with the data network 28 and therefore, access to the DHCP server 50, the temporary DHCP server 140 denies the request using a DHCP NACK message at 206b. The DHCP client 100 receives the DHCP NACK message at 206c and determines that it no longer has a valid IP address.

Figure 4E:
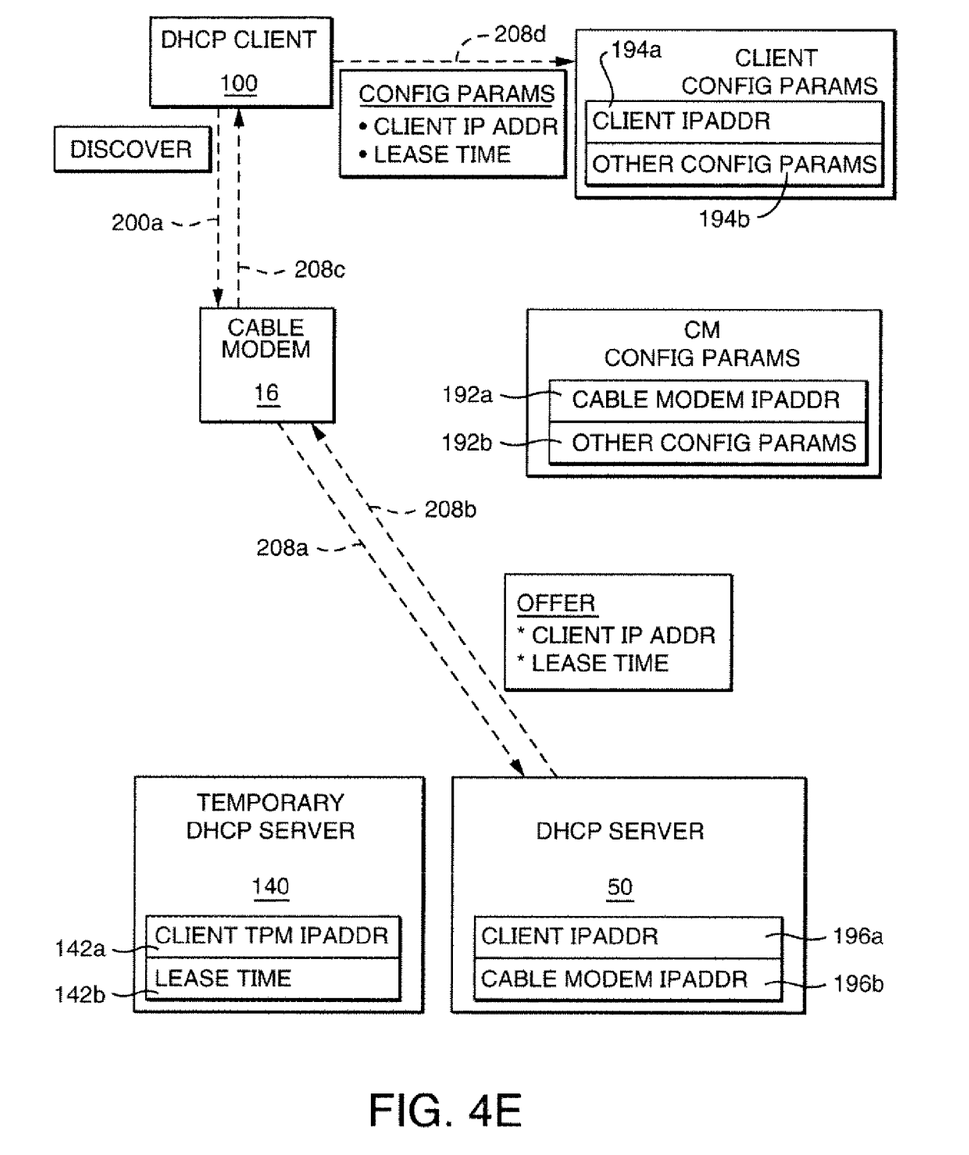

Referring to FIG. 4E, the DHCP client 100 in the CPE 18, sends a DHCP DISCOVER message at 200a to obtain a new IP address. The cable modem 16 receives the message and transmits the message at 208a over the data network 28. The DHCP server 50 responds to the DHCP DISCOVER message at 208b with a DHCP OFFER message containing a legitimate CPE IP address from its database of IP addresses 196. The cable modem 16 sends the DHCP OFFER to the DHCP client 100 at 208c. The DHCP client 100 issues a DHCP REQUEST to accept the configuration parameters. The DHCP server 50 responds with a DHCP ACKNOWLEDGE. When the DHCP client 100 receives the DHCP ACKNOWLEDGE, the DHCP client 100 assigns the configuration parameters including the CPE IP address at 208d.

In a preferred embodiment, the parameters that the DHCP client 100 may receive include:
  IP address
  default gateway
  subnet mask
  domain name
  domain name server
  lease time
  binding time
  renewal time
  tftp filename
  tftp server address These configuration parameters are described in RFC 2131. In a preferred embodiment, the lease time that may be provided in the DHCP OFFER message in FIG. 4E is longer than the lease time provided in the DHCP OFFER message in FIG. 4A.

While the invention has been described in conjunction with presently preferred embodiments of the invention, persons of skill in the art will appreciate that variations may be made without departure from the scope and spirit of the invention. For example, the use of the protocols, tools, operating systems and standards referenced above is merely by way of example. Any suitable protocol, tool, operating system or standard may be used in preferred embodiments of the present invention. In addition, the methods described in FIGS. 4A–4E are described in the context of a data over cable system. However, the temporary configuration server may operate in any network connection that provides access to the data network 28. This true scope and spirit is defined by the appended claims, interpreted in light of the foregoing.

I claim:

1. A method for ensuring a connection to a configuration protocol server on a data network by a customer premises equipment via a network connection, the method comprising the steps of:
   issuing a request for a customer premises equipment network address from the customer premises equipment to the configuration protocol server via the network connection;
   the network connection determining whether a connection can be made to the configuration protocol server, and if not, responding to the customer premises equipment by sending a temporary network address and a lease time to the customer premises equipment, whereby the lease time limits the time of validity of the temporary network address;
   issuing a request to renew the temporary network address when the lease time expires;
   the network connection determining whether a connection can be made to the configuration protocol server, and if not, responding to the customer premises equipment by sending an acknowledge message;
   when the network connection determines that the connection can be made to the configuration protocol, the network connection sending a NACK message declining to acknowledge the request to renew the temporary network address;
   the customer premises equipment receiving the NACK message and sending a request for the customer premises equipment network address; and
   the network connection communicating the request for the customer premises equipment network address to the configuration protocol server.

2. A method as claimed in claim 1, wherein the network connection comprises a communications device for connecting the customer premises equipment to a local network, the local network being connected to the data network via a network interconnection device.

3. A method as claimed in claim 2, wherein the communications device further comprises a temporary configuration server.

4. A method as claimed in claim 2, wherein the network interconnection device further comprises a temporary configuration server.

5. A method as claimed in claim 1, wherein the network connection comprises a communications device for connecting the customer premises equipment to a local network, the local network being connected to the data network via a network interconnection device.

6. A method as claimed in claim 5, wherein the communications device further comprises a temporary configuration server.

7. A method as claimed in claim 5, wherein the network interconnection device further comprises a temporary configuration server.

8. A method for ensuring a connection to a configuration protocol server on a data network by a customer premises equipment via a network connection, the method comprising the steps of:
   issuing a request for a customer premises equipment network address from the customer premises equipment to the configuration protocol server via the network connection;
   the network connection determining whether a connection can be made to the configuration protocol server, and if not, responding to the customer premises equipment by sending a temporary network address and a lease time to the customer premises equipment, whereby the lease time limits the time of validity of the temporary network address;

issuing a request to renew the temporary network address when the lease time expires; and the network connection determining whether a connection can be made to the configuration protocol server, and if not, responding to the customer premises equipment by sending an acknowledge message.

9. A method as claimed in claim 8, wherein the network connection comprises a communications device for connecting the customer premises equipment to a local network, the local network being connected to the data network via a network interconnection device.

10. A method as claimed in claim 9, wherein the communications device includes a cable modem, the local network includes a cable network and the network interconnection device includes a cable modem termination system.

11. A method as claimed in claim 8, wherein the configuration protocol server is a dynamic host configuration protocol (DHCP) server.

12. A method as claimed in claim 8, wherein the customer premises equipment network address used by the customer premises equipment is an Internet protocol (IP) address.

13. A method as claimed in claim 8, wherein the lease time is less than 10 seconds.

14. A method as claimed in claim 8, wherein the data network includes a connection to the Internet.

15. A method for ensuring a connection to a configuration protocol server on a data network by a customer premises equipment via a network connection, the method comprising the steps of:

issuing a request for a customer premises equipment network address from the customer premises equipment to the configuration protocol server via the network connection;

the network connection determining whether a connection can be made to the configuration protocol server, and if not, responding to the customer premises equipment by sending a temporary network address and a lease time to the customer premises equipment, whereby the lease time limits the time of validity of the temporary network address;

issuing a request to renew the temporary network address when the lease time expires;

the network connection determining whether a connection can be made to the configuration protocol server, and if not, responding to the customer premises equipment by sending an acknowledge message;

when the network connection determines that the connection can be made to the configuration protocol, the network connection sending a NACK message declining to acknowledge the request to renew the temporary network address;

the customer premises equipment receiving the NACK message and sending a request for the customer premises equipment network address; and the network connection communicating the request for the customer premises equipment network address to the configuration protocol server.

16. A method as claimed in claim 15, wherein the network connection comprises a communications device for connecting the customer premises equipment to a local network, the local network being connected to the data network via a network interconnection device.

17. A method as claimed in claim 16, wherein the communications device includes a cable modem, the local network includes a cable network and the network interconnection device includes a cable modem termination system.

18. A method as claimed in claim 15, wherein the configuration protocol server is a dynamic host configuration protocol (DHCP) server.

19. A method as claimed in claim 15, wherein the customer premises equipment network address used by the customer premises equipment is an Internet protocol (IP) address.

20. A method as claimed in claim 15, wherein the lease time is less than 10 seconds.

21. A method as claimed in claim 15, wherein the data network includes a connection to the Internet.

* * * * *